United States Patent
Hanafy

(10) Patent No.: US 6,258,034 B1
(45) Date of Patent: Jul. 10, 2001

(54) APODIZATION METHODS AND APPARATUS FOR ACOUSTIC PHASED ARRAY APERTURE FOR DIAGNOSTIC MEDICAL ULTRASOUND TRANSDUCER

(75) Inventor: Amin M. Hanafy, Los Altos Hills, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/368,642

(22) Filed: Aug. 4, 1999

(51) Int. Cl.[7] ................................................ A61B 8/12
(52) U.S. Cl. ............................................ 600/459; 29/25.35
(58) Field of Search .................................. 600/459, 443, 600/447; 29/25.35; 310/327; 367/162

(56) References Cited

U.S. PATENT DOCUMENTS

| | | | |
|---|---|---|---|
| 5,445,155 | * 8/1995 | Sieben | 600/443 |
| 5,570,691 | 11/1996 | Wright et al. | 128/661.01 |
| 5,629,906 | * 5/1997 | Sudol et al. | 367/162 |
| 5,638,822 | * 6/1997 | Seyed-Bolorforosh et al. | 600/459 |
| 5,667,373 | 9/1997 | Wright et al. | 128/660.07 |
| 5,675,554 | 10/1997 | Cole et al. | 367/138 |
| 5,685,308 | 11/1997 | Wright et al. | 128/660.07 |
| 5,827,188 | 10/1998 | Wright et al. | 300/447 |
| 5,865,955 | 1/1999 | Cole et al. | 367/138 |
| 5,882,307 | 3/1999 | Wright et al. | 600/442 |
| 6,124,664 | * 9/2000 | Mamayek et al. | 310/327 |

OTHER PUBLICATIONS

Chapter 10 Angular Accuracy and Resolution, Chapter 12, Adaptive Nulling, of Principles of Aperture System Design, by B. Steinberg, John Wiley and Sons (1970).

"Equivalent Circuits for Transducers Having Arbitrary Even—or Odd—Symmetry Piezoelectric Exitation." by D. Leedom, et al., IEEE Transactions on Sonics and Ultrasonics, vol. SU–13, pp. 128–141 (1971).

"Acoustic Matching and Backing Layers for Medical Ultrasound Transducers," by M. Grewe, Pennsylvania State Univesity, May 1989.

David L. Hykes, et al., *Ultrasound Physics and Instrumentation*, 1992, pp. 1–139.

* cited by examiner

*Primary Examiner*—Francis J Jaworski
*Assistant Examiner*—Ali M. Imam
(74) *Attorney, Agent, or Firm*—Brinks Hofer Gilson & Lione

(57) ABSTRACT

An apparatus and method using a backing block having a variable acoustic impedance as a function of elevation or azimuth, to achieve a desirable apodization of the aperture of an ultrasound transducer stacked with the backing block. The backing block has a gradient profile in acoustic impedance that changes from a minimum value to a maximum value along the elevation direction and/or azimuthal direction of the stacked ultrasound transducer. Typically, the backing block has an elevation gradient profile in acoustic impedance that increases from a minimum value of acoustic impedance near the center of the backing block to a maximum value of acoustic impedance at opposing lateral faces of the backing block. The backing block can be discretely segmented in acoustic impedance, with as many segments as are practically manufacturable. An individual segment can have a uniform or variable acoustic impedance. The backing block can be continuous in acoustic impedance, with a minimum acoustic impedance in the center and a maximum acoustic impedance at two or more planar lateral faces.

56 Claims, 6 Drawing Sheets

APODIZATION METHODS AND APPARATUS FOR ACOUSTIC PHASED ARRAY APERTURE FOR DIAGNOSTIC MEDICAL ULTRASOUND TRANSDUCER

BACKGROUND OF THE INVENTION

1. Field of the Invention

This invention relates generally to an improvement in diagnostic medical ultrasound imaging, and more specifically to reducing elevation side lobe image artifacts.

2. Description of the Prior Art

There is growing interest in 2-D ultrasound images for medical applications. Medical ultrasound systems are described in U.S. Pat. No. 5,570,691, U.S. Pat. No. 5,667,373, U.S. Pat. No. 5,685,308, U.S. Pat. No. 5,827,188 and U.S. Pat. No. 5,882,307 to Wright, et al.; and U.S. Pat. No. 5,856,955 and U.S. Pat. No. 5,675,554 to Cole, et al. The theory of medical ultrasound imaging is extensively discussed in *Physics and Instrumentation of Diagnostic Medical Ultrasound*, by Peter Fish, pp. 1–189 (1990).

A medical ultrasound system includes a transmit beamformer to send electrical signals to an ultrasound transducer, which converts these electrical signals into acoustic pressure waves. The ultrasound transducer also converts received acoustic pressure wave signals into electrical signals to be processed by a receive beamformer and a signal processor. The ultrasound transducer is typically a 1-D ultrasound phased array transducer that provides the electrical signals that are ultimately processed to generate a 2-D image on a display device, where, in a typical B-mode image, each pixel location within the image corresponds to a spatially localized region being imaged. The brightness or color that is assigned to each pixel in the image is a function of the amplitude of the signal received by the 1-D ultrasound phased array transducer from the corresponding region. The amplitude of the received signal is also dependent on the transmission and reception characteristics of the ultrasound transducer itself.

A 1-D ultrasound phased array transducer typically comprises 64 to 128 elements in a linear array, on a 0.1 to 0.3 millimeter (mm) element-to-element pitch. The elements are typically between 2 and 14 mm in the elevation dimension (i.e., perpendicular to the line direction of the linear array, otherwise referred to as the azimuthal direction). Typically, all phased array transducers are subdivided in the azimuthal direction by dicing during array assembly, resulting in independent array elements that enable electronic steering, focusing, and dynamic apodization. However, these independent array elements are not perfectly unidirectional transducers, because such transducers frequently have transmission and reception image sensitivities at angles to their main direction sensitivity. An image sensitivity at an angle to the main imaging direction of the transducer element is called a side lobe.

A phased array transducer element with significant imaging side lobes is sensitive to echoes from structures outside the main beam, because the side lobe echoes would be interpreted and displayed by the ultrasound system as though received from a structure in the main beam direction. This spurious image is called a side lobe image artifact. Such image artifacts can be hard to distinguish from true images. In fact, a strong reflector located in the same direction as a side lobe could generate an image with an intensity equal to the intensity of an image generated by a weak reflector located in the direction of the main beam.

Proper amplitude apodization of the aperture reduces or nearly eliminates side lobes with their associated image artifacts. Apodization of the elevation aperture is always difficult to achieve, since the aperture is not normally subdivided in that direction. The only existing method in the prior art involves subdividing the elevation aperture, which increases the cost and complexity of the associated transducer and system. Apodization of the azimuthal aperture is either not attempted in low cost ultrasound systems, or is accomplished in higher cost ultrasound systems by expensive electronic circuitry.

What is needed is a relatively low cost apparatus and method that will achieve the correct apodization to reduce side lobes and side lobe image artifacts by offsetting the negative apodization of an elevation geometric lens. What is also needed is an apparatus and method to achieve a better apodization aperture, compatible with an ultrasound transducer probe assembly having a conventional, uniform thickness PZT design, or any other design.

SUMMARY OF THE INVENTION

An object of the invention is to provide a relatively low cost apparatus and method that will achieve the correct apodization to reduce side lobes and side lobe image artifacts by offsetting the negative apodization of an elevation geometric lens.

Another object of the invention is to provide an apparatus and method to achieve a better apodization aperture, compatible with an ultrasound transducer probe assembly having a conventional, uniform thickness PZT design, or any other design.

A first aspect of the invention is directed to an improved medical ultrasound probe, wherein the improvement comprises a backing block having a gradient in acoustic impedance that changes as a function of elevation or azimuth.

A second aspect of the invention is directed to a method for fabricating a backing block having a variable acoustic impedance. The method involves adding particles to a curable liquid, creating a concentration gradient of the particles in the curable liquid, and curing the liquid to form a solid backing block material. The method also involves cutting the solid backing block material into at least two segments, and bonding one segment with one or more other segments to form a backing block with a substantially symmetrical gradient of acoustic impedance. The lowest acoustic impedance is substantially at the center of the backing block and the highest acoustic impedance is substantially at two lateral faces of the backing block.

These and other objects and advantages of the invention will become apparent to those skilled in the art from the following detailed description of the invention and the accompanying drawings.

DETAILED DESCRIPTION OF PREFERRED EMBODIMENTS OF THE INVENTION

This invention provides an independent apodization apparatus and method to achieve a desirable aperture apodization function for minimizing side lobes and their artifacts. The following apparatus and method corrects for the reverse apodization from an ultrasound transducer probe lens, and by design can achieve any desirable apodization function (e.g., Hamming, Hanning, raised cosine, or other functions). These apodization functions are discussed in Chapter 10, *Angular Accuracy and Resolution*, and Chapter 12, *Adaptive Nulling*, of *Principles of Aperture System Design*, by B. Steinberg, John Wiley and Sons (1976), hereby incorporated by reference.

Figure 1B:
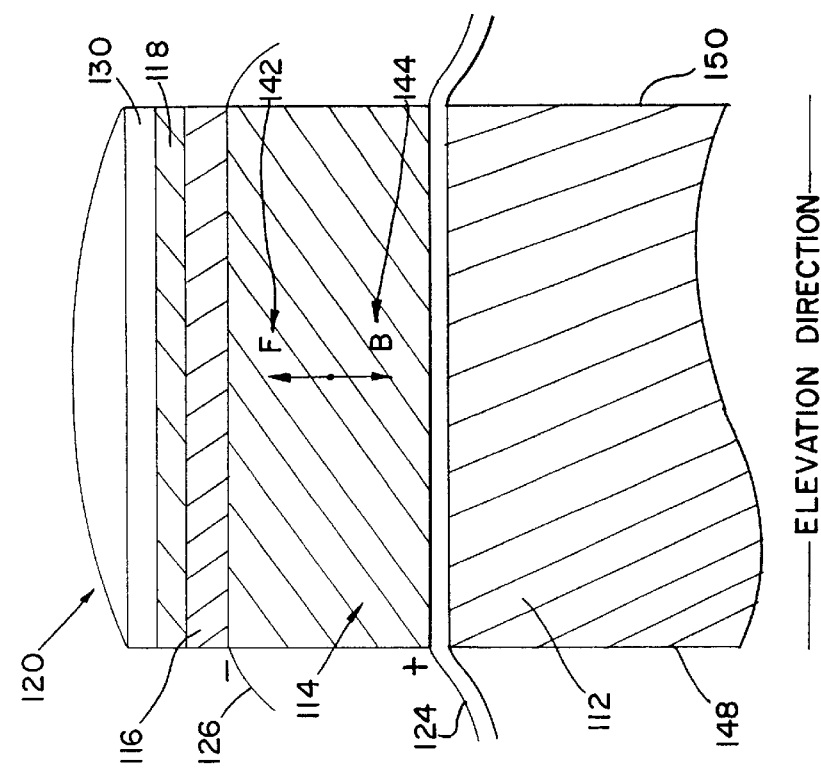
FIG. 1(b) shows the stacked structure in the elevation dimension of the ultrasound transducer probe subassembly, matching layer, and lens shown in FIG. 1(a).
Figure 1A:
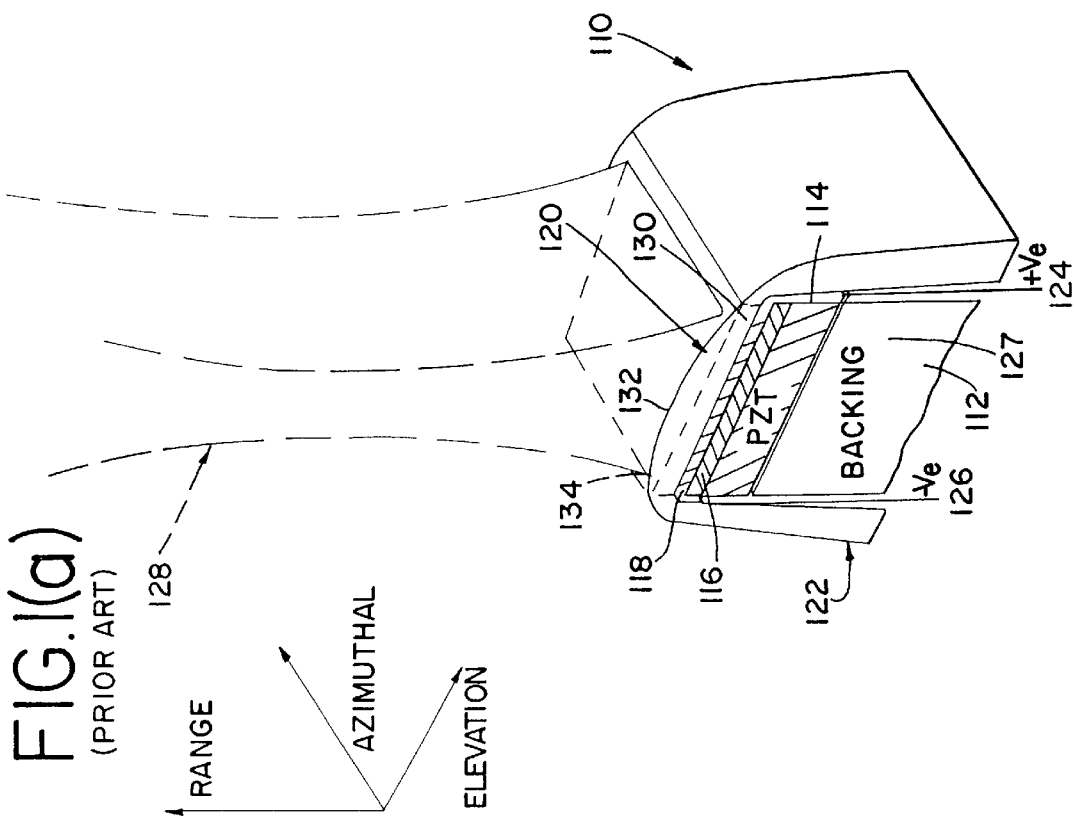
FIG. 1(a) shows a partial perspective view, cut away to reveal a cross-section taken along the elevation direction, of a conventional ultrasound transducer probe assembly with a RTV geometric lens stacked above a transducer assembly.

FIG. 1(a) shows a partial perspective view, cut away to reveal a crosssection taken along the elevation direction, of a conventional ultrasound transducer probe assembly 110 with plastic housing 122, with room temperature vulcanizing silicone rubber (RTV) geometric lens 120 in the ultrasound beam path. FIG. 1(a) also shows radiation pattern 128 above RTV geometric lens 120 and RTV pedestal 130. RTV geometric lens 120 introduces undesirable negative apodization in the elevation direction, with a stronger signal at the edge 134 of the aperture and a weaker signal in the center 132 due to lens insertion loss. A desirable apodization in the elevation direction produces a stronger signal at the center 132 of the aperture and a weaker signal at the edge 134 of the aperture. RTV geometric lens 120 and RTV pedestal 130 (which can be formed from an integral piece of RTV material) are stacked on top of acoustic impedance matching layers 116 and 118, which are stacked above lead zirconate titanate (PZT) layer 114. Ground return 126 is bonded to the upper face of PZT layer 114 and under matching layer 116. Flexible circuit 124 is bonded to the bottom face of PZT layer 114, and is above backing block 112. Backing block 112 has an upper face (not shown) parallel to lens 120, a lower face (not shown) parallel to the upper face, a pair of lateral elevation faces (not shown but parallel to cross-section 127) running parallel to the elevation direction, and a pair of lateral azimuthal faces (not shown) running parallel to the azimuthal direction.

The bonded assembly of an ultrasound transducer array (e.g., PZT layer 114), flexible circuit 124, and backing block 112 is herein referred to as an ultrasound transducer probe subassembly. The bonded assembly of one or more acoustic impedance matching layers 116 and 118, PZT layer 114, ground return 126, and flexible circuit 124 is herein referred to as an ultrasound transducer assembly.

A stacked relationship exists when two layers are bonded together, or when additional intervening layers are between the two layers. A transducer array is in a stacked relationship with a backing block, whether the transducer array is directly bonded to the backing block, or there are intervening layers between the transducer array and the backing block. For example, a backing block and a PZT layer can be in a stacked relationship, and yet have a flexible circuit between them. Another example is that a geometric lens and a transducer can be in a stacked relationship, and yet have one or more matching layers between them.

FIG. 1(b) shows the structure in the elevation dimension of the ultrasound transducer probe assembly shown in FIG. 1(a). Lens 120 and pedestal 130 are stacked on top of acoustic impedance matching layers 116 and 118, which are stacked above ground return 126 and lead zirconate titanate (PZT) layer 114. Flexible circuit 124 is sandwiched between PZT layer 114 and backing block 112 to form an ultrasound transducer probe subassembly. Backing block 112 has lateral azimuthal faces 148 and 150 (shown edgewise). Forward wave "F" 142 and backward wave "B" 144 are shown inside PZT layer 114. Resultant radiated wave "R" 146 is shown above lens 120.

This ultrasound transducer probe assembly can be analyzed using the KLM model, which is an electrical analog model of the mechanical components of an acoustic circuit. This model is described in detail in the article "Equivalent Circuits for Transducers Having Arbitrary Even- or Odd-Symmetry Piezoelectric Excitation," by D. Leedom, et al., *IEEE Transactions on Sonics and Ultrasonics*, Vol. SU-18, pp. 128–141 (1971). Using the KLM model, upon impulse excitation of the piezoelectric crystal, PZT layer 114, forward and backward waves are emitted from the center of the crystal. If the acoustic impedance of backing block 112 is perfectly matched to the acoustic impedance of PZT layer 114, the backward wave "B" 144 is fully absorbed and the resulting pressure wave "R" 146 equals only the forward wave "F" 142. If backing block 112 has low acoustic impedance, the backward wave "B" 144 almost fully reflects and adds coherently to the forward wave "F" 142, which increases the resulting pressure wave "R" 146.

A backing block fabricated according to a preferred embodiment of the invention is a composite material of high density particles suspended in a matrix of thermosetting material or thermoplastic material. This is called a 0–3 composite, because the particles have zero connectivity in the x, y, and z directions, while the matrix material (e.g., epoxy, urethane, vinyl, or other material) has connectivity in all three directions. Typically, the high density particles are in powder form, and have a size of seven microns or less.

Figure 2:
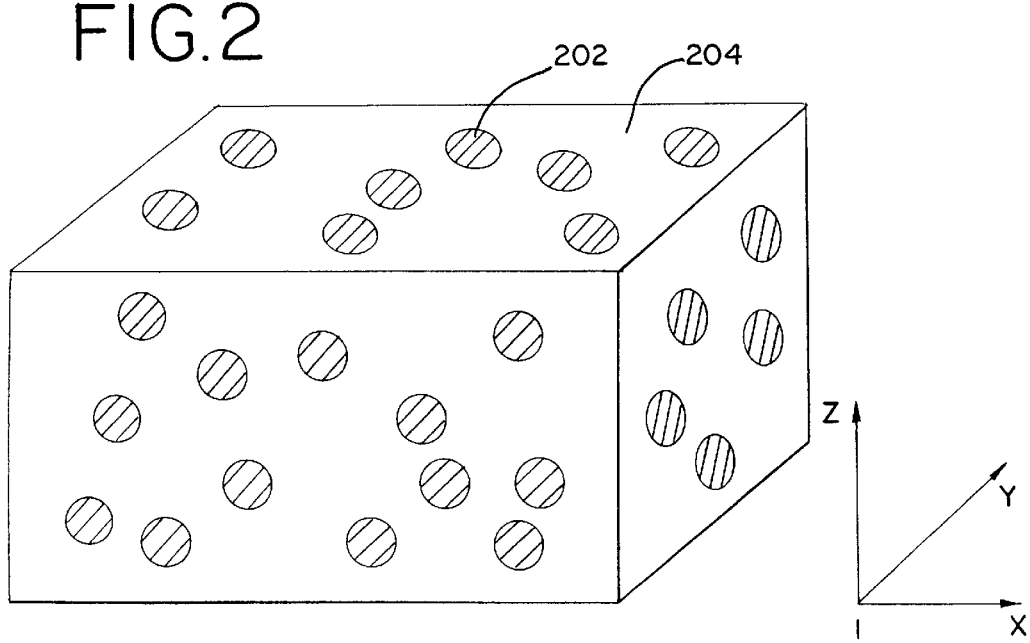
FIG. 2 shows an example of a 0–3 composite matrix.

FIG. 2 shows an example of a 0–3 composite matrix with high density particles 202 and matrix material 204. The high density particles 202 occupy a particle volume fraction "α" of the composite matrix volume and the remainder of the composite matrix volume consists of the matrix material 204.

The acoustic impedance for a 0–3 composite matrix is described in detail in a Master's thesis entitled "Acoustic Matching and Backing Layers for Medical Ultrasound Transducers," by M. Grewe, Pennsylvania State University, May 1989. The acoustic impedance of a uniform 0–3 composite matrix is calculated by the following equation:

$$\log(Z_{composite}) = (\alpha)\log(Z_{particle}) + (1-\alpha)\log(Z_{matrix}) \quad (1)$$

where "α" is the volume fraction of the particles 202 in the composite, "1−α" is the matrix material 204 volume fraction of the composite, $Z_{composite}$ is the acoustic impedance of the composite, $Z_{particle}$ is the acoustic impedance of the particle material (e.g., tungsten), and $Z_{matrix}$ is the acoustic impedance of the matrix material (e.g., vinyl). The acoustic impedance for the composite matrix in a variable impedance backing block depends on the process used, the temperature used in the curing process, and whether vibration or centrifugal forces are applied to vary the particle locations in the composite matrix shown in FIG. 2.

Figure 3:
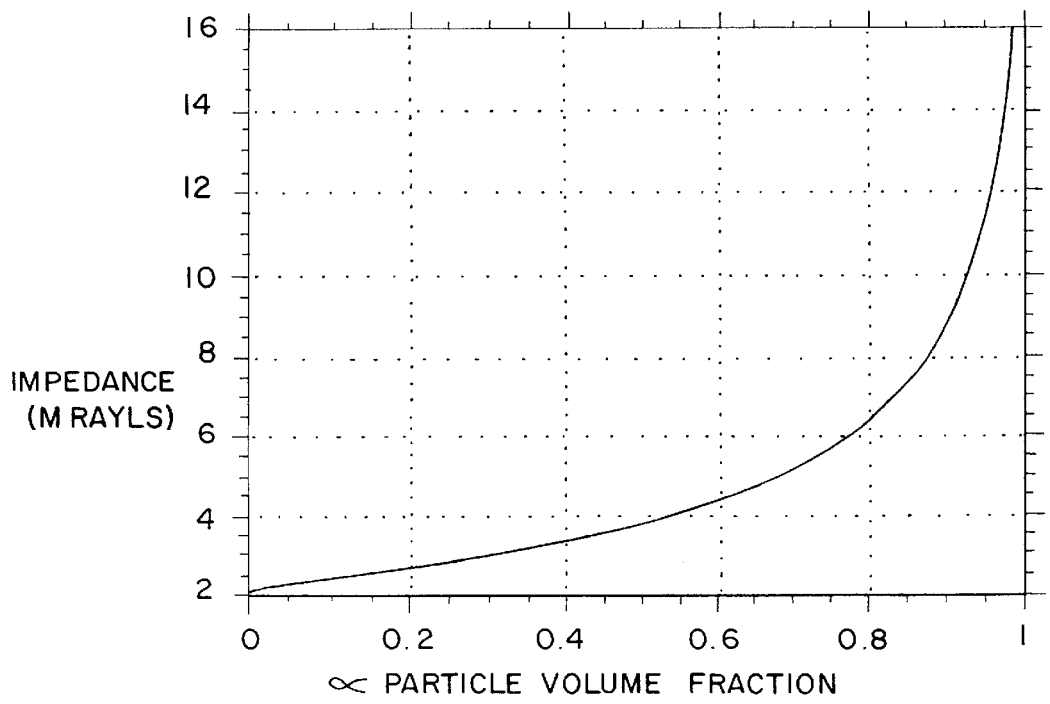
FIG. 3 shows a graph of acoustic impedance for a 0–3 composite matrix as a function of the volume fraction of particles in the composite matrix.

FIG. 3 shows a graph of acoustic impedance for a 0–3 composite matrix (see FIG. 2) as a function of "α," the volume fraction of the particles in a composite matrix, as calculated by equation (1). A sharp apodization function (e.g., a Hamming function, a Gaussian function, or some equivalent function) can be achieved by high speed centrifugal spinning, combined with a raised temperature to accelerate cross-linking of the thermosetting matrix material, in one embodiment of the invention. Alternatively, an apodization function close to a raised cosine function can be achieved by room temperature curing of the thermosetting matrix material, and using only gravity to slowly create the particle concentration gradient in the cross-linking thermosetting matrix material.

Figure 4:
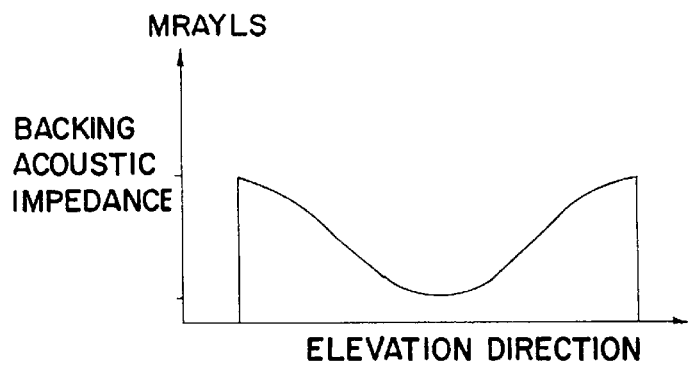
FIG. 4 shows the acoustic impedance profile for a backing block constructed with a low acoustic impedance in the middle and a high acoustic impedance at two lateral azimuthal faces (not shown).

FIG. 4 shows the acoustic impedance profile as a function of elevation direction for a backing block fabricated with low acoustic impedance in the middle of the elevation direction, producing coherent addition ("R"="F"+"B"), and fabricated with high acoustic impedance at the boundaries of the elevation direction, corresponding to the lateral azimuthal faces (not shown), producing no coherent addition ("R"="F"). The most preferred backing block achieves a correct one-way apodization of 6 dB at two lateral azimuthal faces with a variable acoustic impedance ranging from 0 to 30 MegaRayleighs (MRayls), and a flexible circuit 124 (shown in FIG. 1(b)) constructed of a uniform conductive layer. An alternative preferred backing block has a variation in acoustic impedance ranging from 3 to 20 MRayls. A less preferred backing block has a variation in acoustic impedance ranging from 3 to 11 MRayls. One Rayleigh equals one kilogram per meter squared per second.

Figure 5B:
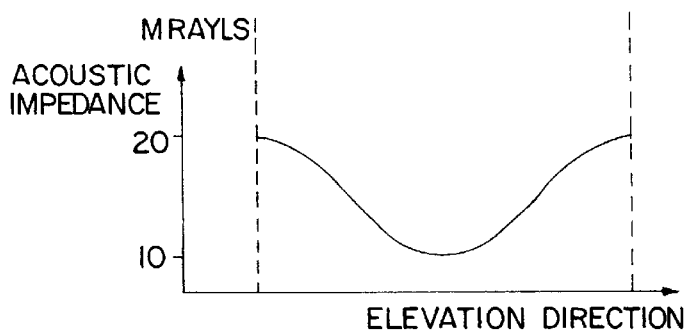
FIG. 5(b) shows the acoustic impedance gradient along the elevation direction of the backing block shown in FIG. 5(a).
Figure 5A:
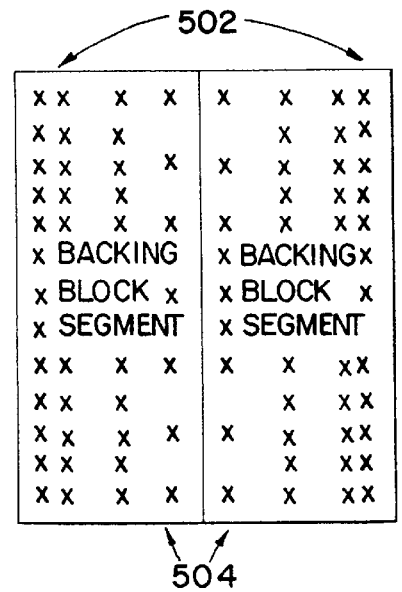
FIG. 5(a) shows one approach for fabricating a backing block with a smoothly variable acoustic impedance gradient by cutting and bonding backing block segments with variable concentrations of tungsten particles suspended in vinyl.

FIG. 5(a) shows one approach for fabricating a backing block with a variable acoustic impedance gradient by cutting and bonding backing block segments with variable concentration gradients of tungsten particles suspended in vinyl. Various concentration gradients of tungsten particles in vinyl can be obtained by horizontally cutting segments of a solidified tungsten vinyl solution and vertically bonding the discrete segments together to form a backing block.

The outer regions 502 near the lateral azimuthal faces (not shown) have a high concentration of tungsten particles suspended in vinyl. Here, a high concentration of tungsten particles means at least 30 percent tungsten particles and 70 percent vinyl by weight, preferably 70 percent tungsten particles and 30 percent vinyl by weight, and most preferably 90 percent tungsten particles and 10 percent vinyl by weight.

The central regions 504 have a low concentration of tungsten particles suspended in vinyl. Here, a low concentration of tungsten particles means no more than 20 percent tungsten particles and 80 percent vinyl by weight, preferably no more than 10 percent tungsten particles and 90 percent vinyl by weight, and most preferably 100 percent vinyl or some other low density material.

FIG. 5(b) shows the acoustic impedance gradient along the elevation direction of the backing block shown in FIG. 5(a). The backing block regions with a high concentration of tungsten particles suspended in vinyl have high acoustic impedance. For example, a backing block comprised of a solution of 70 percent 5 μm size tungsten particles and 30 percent vinyl by weight yields an acoustic impedance of 20 MRayls. The backing block regions with a low concentration of tungsten particles suspended in vinyl have low acoustic impedance. For example, a backing block comprised of a solution of 100 percent vinyl has an acoustic impedance of 3 MRayls. Therefore, as shown in FIG. 5(a), the outer regions 502 near the lateral azimuthal faces (not shown) have high acoustic impedance, and the central regions 504 have low acoustic impedance. Preferably, the acoustic impedance gradient is continuous in the center region, i.e., both segments of backing block should have the same concentration of tungsten particles suspended in vinyl at the bonded interface. Moreover, the acoustic impedance gradients of the two segments should be symmetrical around the center bond, as will be the case if the concentration gradients of tungsten particles suspended in vinyl are symmetrical around the center bond.

A concentration gradient results from tungsten particles sinking in a liquid vinyl solution. The tungsten particles will sink over time when the vinyl medium is liquid, because the tungsten particles have a higher density than vinyl. Once the tungsten vinyl solution is solidified, then the concentration of tungsten particles in the solution is substantially fixed. This results in a relatively low concentration of tungsten particles in the top region of the solution and a relatively high concentration of tungsten particles in the bottom region of the solution. Such concentration gradients of tungsten particles can substantially vary along a spatial dimension according to a function, such as a linear, parabolic, exponential, Gaussian, or complementary error function, depending on the temperature-determined curing rate of the vinyl and the forces exerted on the tungsten particles. For example, a higher temperature will normally increase the curing rate of the vinyl and reduce the slope of the concentration gradient of tungsten particles along a spatial dimension. However, application of forces in addition to gravity on the tungsten particles can increase the slope of the concentration gradient of tungsten particles along a spatial dimension. For example, centrifugal force from a centrifuge can be applied to a tungsten vinyl solution to more quickly achieve the formation of a large concentration gradient of tungsten particles in the vinyl solution along a dimension parallel to the direction of the applied centrifugal force. As another example, vibration can be applied to a tungsten vinyl solution to more quickly achieve the formation of a large concentration gradient of tungsten particles in the vinyl solution.

The preferred embodiments of the invention use one to five micron size tungsten particles, but alternative embodiments of the invention could use tungsten particles having any size less than seven microns or a size that does not result in specular reflection of ultrasound from the particle, especially at high frequencies. Other metals, metal oxides, compounds, or combinations thereof could be used instead of tungsten, such as tungsten trioxide, tungsten carbide, iron, iron oxides, titanium oxides, aluminum oxides, silicon carbide, and silicon nitride. The preferred embodiments of the invention are fabricated from commercially available vinyl. However, alternative embodiments of the invention could be fabricated from any thermoplastic or thermosetting material composed of one or two components, with an initially low viscosity liquid phase that allows the tungsten particles or other high density particles to spatially vary in concentration in the backing block. In the preferred embodiments of the invention, a backing block is fabricated from a thermoplastic with a glass transition temperature above 120° C., but alternative embodiments of the invention can be fabricated from thermosetting materials with a setting temperature above 60° C.

The most preferred embodiments of the invention that achieve the highest differential particle concentration gradient are fabricated from thermal compression molding grade powder polyvinylidene chloride commercially available from Dow Chemicals USA, located in Midland, Mich., and Union Carbide Chemicals and Plastics Company, located in Danbury, Conn. The most preferred embodiments of the invention are fabricated from a grade of 99.9 percent pure tungsten commercially available in one micron size particles from Consolidated Astronautics, located in Hauppauge, N.Y., and commercially available in three to ten micron size particles from Atlantic Equipment Engineers, located in Bergenfield, N.J.

Figure 5C:
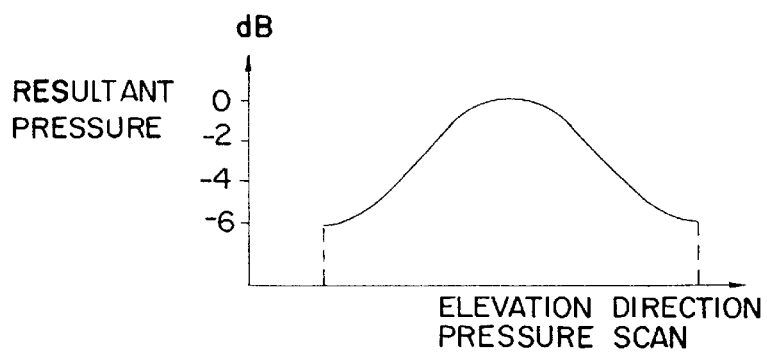
FIG. 5(c) shows the resulting exiting radiation pressure gradient achieved by cutting and bonding backing block segments with variable concentrations of tungsten particles suspended in vinyl to make the variable impedance backing block shown in FIG. 5(a).

FIG. 5(c) shows the resulting exiting radiation pressure gradient achieved by cutting and bonding backing block segments with variable concentrations of tungsten particles suspended in vinyl to make the variable impedance backing block shown in FIG. 5(a).

Figure 6A:
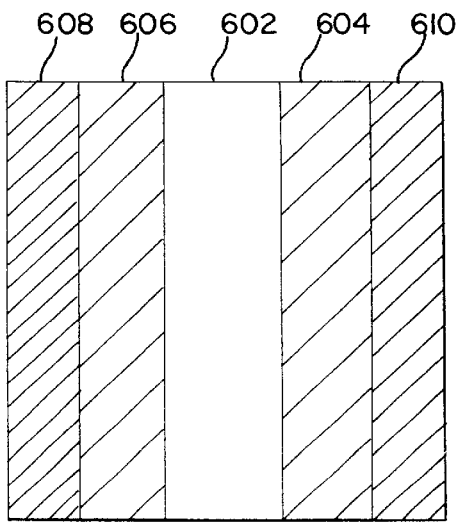
FIG. 6(a) shows a backing block consisting of discrete segments bonded by thermal compression, resulting in a backing block with a discrete gradient of acoustic impedance along the elevation direction.

FIG. 6(a) shows a backing block consisting of discrete segments bonded by thermal compression, resulting in a backing block with a discrete gradient of acoustic impedance along the elevation direction. Center segment 602 of the backing block consists of Porex® material. Porex® is commercially available from Porex Technologies Corporation, located in Fairburn, Georgia. Segments 604 and 606, adjacent to center segment 602, consist of an intermediate concentration of tungsten particles suspended in vinyl. Here, an intermediate concentration of tungsten particles means at least 30 percent tungsten particles and 70 percent vinyl by weight, but no more than 70 percent tungsten particles and 30 percent vinyl by weight. Lateral face segments 608 and 610 consist of a solution of 90 percent tungsten particles and 10 percent vinyl by weight. The number of discrete segments that can be bonded together is limited only by what is practically manufacturable. Here, an individual segment has a uniform acoustic impedance, but alternatively, an individual segment could have a variable acoustic impedance.

Figure 6B:
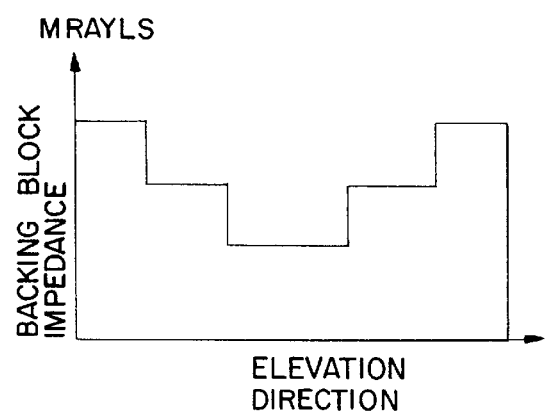
FIG. 6(b) shows the discrete gradient of the acoustic impedance achieved from the bonding of discrete segments in the backing block shown in FIG. 6(a).

FIG. 6(b) shows the discrete gradient of the acoustic impedance achieved from the bonding of discrete segments in the backing block shown in FIG. 6(a). The lowest acoustic impedance is achieved in center segment 602, consisting of Porex® material. The next lowest acoustic impedance is achieved in segments 604 and 606, consisting of an intermediate concentration of tungsten particles suspended in vinyl. The highest acoustic impedance is achieved in lateral face segments 608 and 610, consisting of 90 percent tungsten particles and 10 percent vinyl by weight. An acoustic impedance of 30 MRayls is achieved with a solution of 90 percent tungsten particles and 10 percent vinyl by weight. A full theoretical maximum 6 dB one-way apodization function can be achieved in a backing block incorporating Porex® material for the center segment 602.

In a preferred embodiment of the invention, the bonding of the backing block segments is achieved by thermal compression bonding at a pressure of 60 to 70 pounds per square inch and a bonding temperature of 60° C. A bonding epoxy identical to the material used in forming the backing block material, with a bond line of two to three microns, should be used to avoid creating a discontinuity in the backing block impedance.

Thermal compression is also sometimes a useful method for making individual backing block segments. An individual backing block segment with an acoustic impedance of 30 MRayls can be fabricated from a tungsten vinyl solution by thermal compression using a pressure exceeding 20,000 pounds per square inch at a temperature above 150° C. for approximately half an hour.

Figure 7:
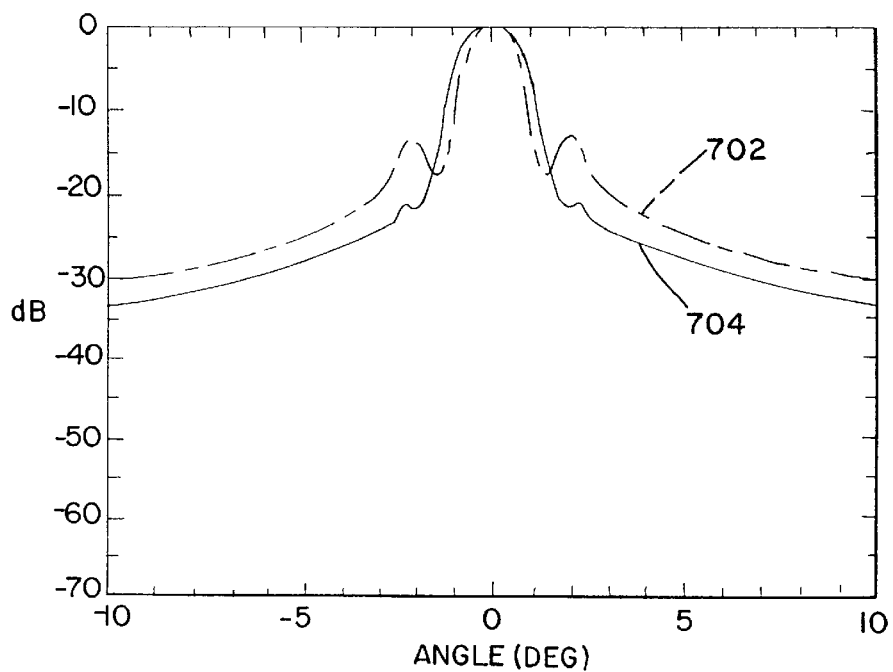
FIG. 7 shows an undesirable aperture apodization (dotted curve) of a ultrasound transducer assembly stacked with a backing block having a conventional, uniform impedance, and a desirable aperture apodization (solid curve) achieved by the same ultrasound transducer assembly stacked with a variable impedance backing block.

FIG. 7 shows an undesirable aperture apodization (dotted curve) of a ultrasound transducer assembly stacked with a backing block having a conventional, uniform impedance, and a desirable aperture apodization (solid curve) achieved by the same ultrasound transducer assembly stacked with a variable impedance backing block. The vertical axis is signal strength in units of dB and the horizontal axis is the angle in the elevation direction from the transducer's elevation direction. The dotted curve 702 represents the undesirable negative apodization due to the geometric lens stacked above a transducer array, present in approximately 90 percent of the commercially available transducer probe assemblies with a conventional backing block. The solid curve 704 represents a desirable apodization that can be obtained from a transducer array stacked with a backing block fabricated according to one embodiment of the invention. Curves 702 and 704 show the improvement in side lobe suppression from only the one-way transmission path. This embodiment of the invention achieves a full 6 dB one-way aperture apodization on the side lobe level. The side lobe suppression would be doubled for a round trip path including transmission and reception of ultrasound waves.

Figure 8A:
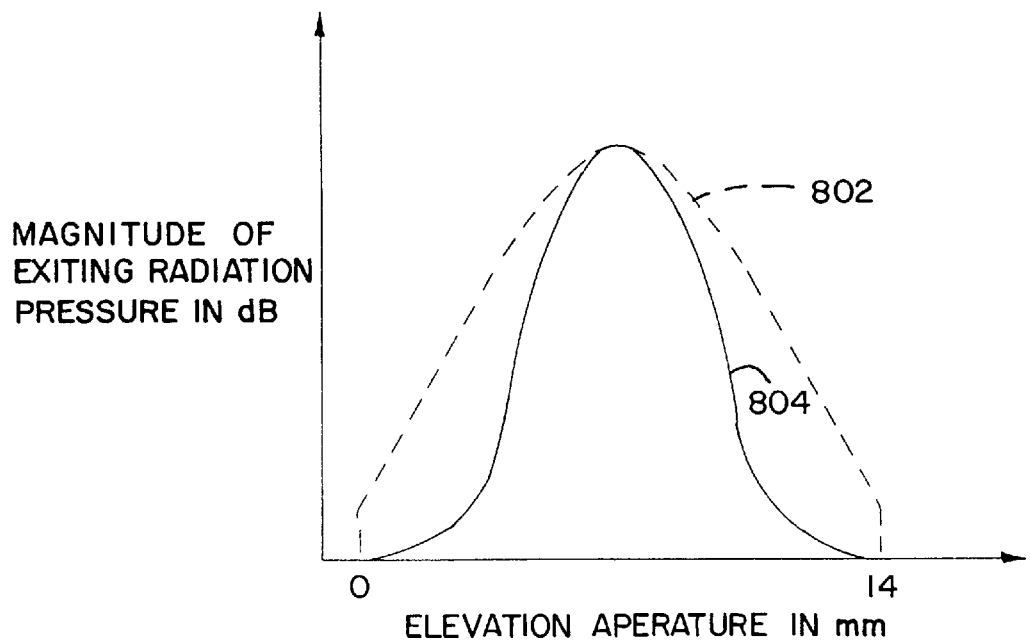
FIG. 8(a) shows (by a dotted curve) the magnitude of the exiting radiation pressure in dB versus the elevation aperture from 0 to 14 mm, produced by a plano-concave transducer array having an upper face that is curved in the elevation direction, stacked with a conventional backing block; and shows (by a solid curve) the result from the same plano-concave transducer array stacked with a variable impedance backing block.

FIG. 8(a) shows by a dotted line 802 the magnitude of the exiting radiation pressure in dB versus the elevation aperture from 0 to 14 mm, produced by a non-uniform thickness plano-concave transducer array having an upper face that is curved in the elevation direction, stacked with a conventional backing block. The non-uniform thickness ultrasound transducer array has two lateral azimuthal faces and two lateral elevation faces substantially parallel to corresponding lateral faces of the backing block, and two horizontal faces, one horizontal face proximal to the backing block. A solid line 804 on FIG. 8(*a*) represents the result from the same plano-concave transducer array stacked with a variable acoustic impedance backing block. The variable acoustic impedance backing block varies in acoustic impedance along the elevation direction and thereby further improves the elevation aperture apodization achieved by the curve of the plano-concave transducer array. Plano-concave transducer arrays are disclosed in more detail in U.S. Pat. No. 5,415,175 to Hanafy, et al., assigned to the assignee of the present invention and hereby incorporated by reference.

Figure 8B:
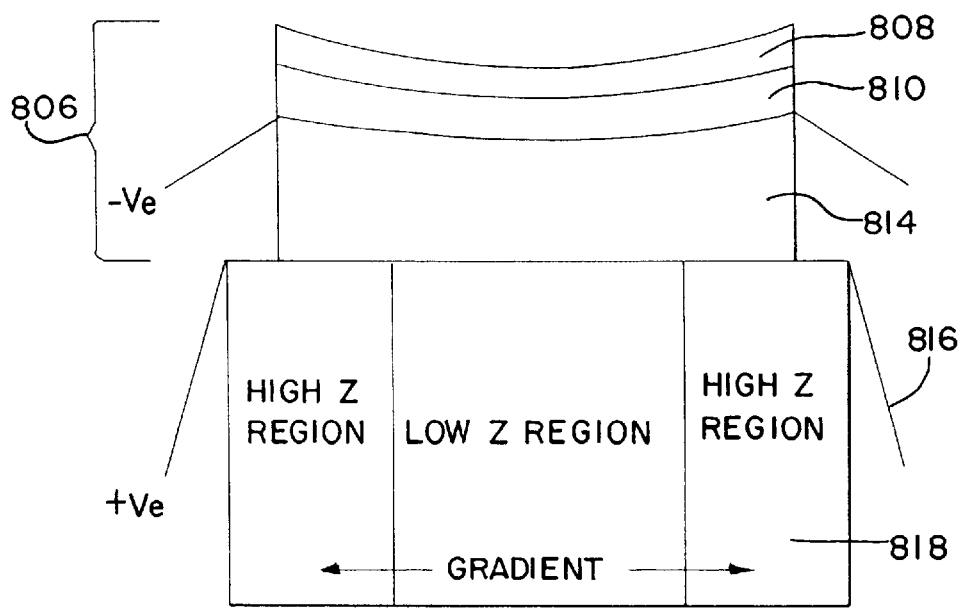
FIG. 8(b) shows a cross-section along the elevation direction of the corresponding backing block and plano-concave transducer array for the solid curve shown in FIG. 8(a).

FIG. 8(*b*) shows a cross-section along the elevation direction of the corresponding backing block 818 and plano-concave transducer assembly 806 for the solid curve shown in FIG. 8(*a*). Plano-concave transducer assembly 806 comprises low acoustic impedance matching layer 808, high acoustic impedance matching layer 810, ground return 812, transducer array (i.e., piezo-electric crystal) 814, and flexible circuit 816, and is stacked with variable acoustic impedance backing block 818. Plano-concave transducer array 814 is also called a "forward plano-concave" transducer array. The variable acoustic impedance backing block 818 has an acoustic impedance at the lateral azimuthal faces of the block that is relatively higher than the low acoustic impedance in the center of the block.

Figure 9A:
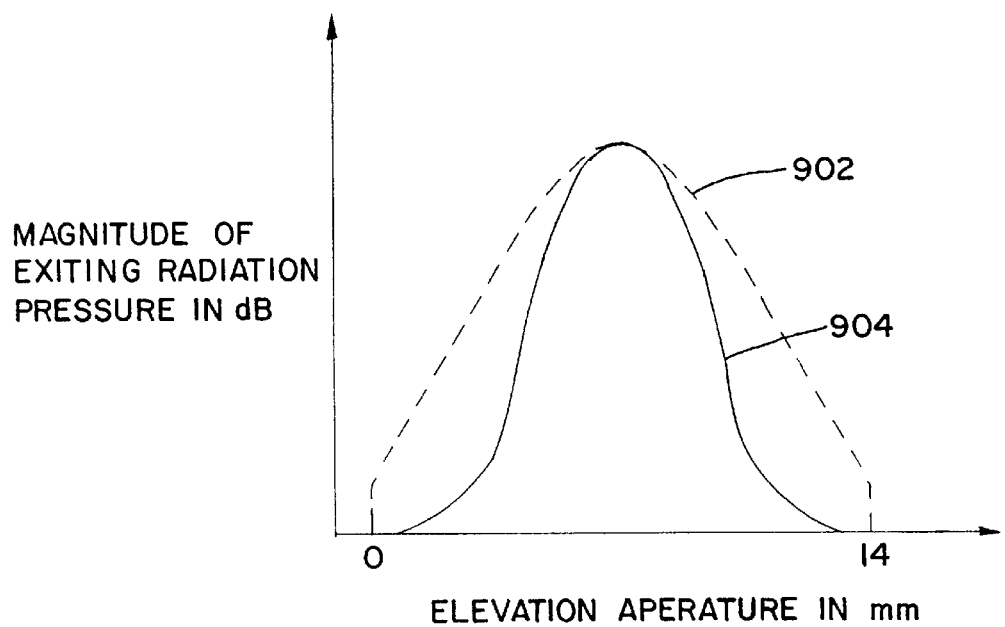
FIG. 9(a) shows (by a dotted curve) the magnitude of the exiting radiation pressure in dB versus the elevation aperture from 0 to 14 mm, produced by a plano-concave transducer array having a bottom face that is curved in the elevation direction, stacked with a conventional backing block; and shows (by a solid curve) the result from the same plano-concave transducer array stacked with a variable impedance backing block.
Figure 9B:
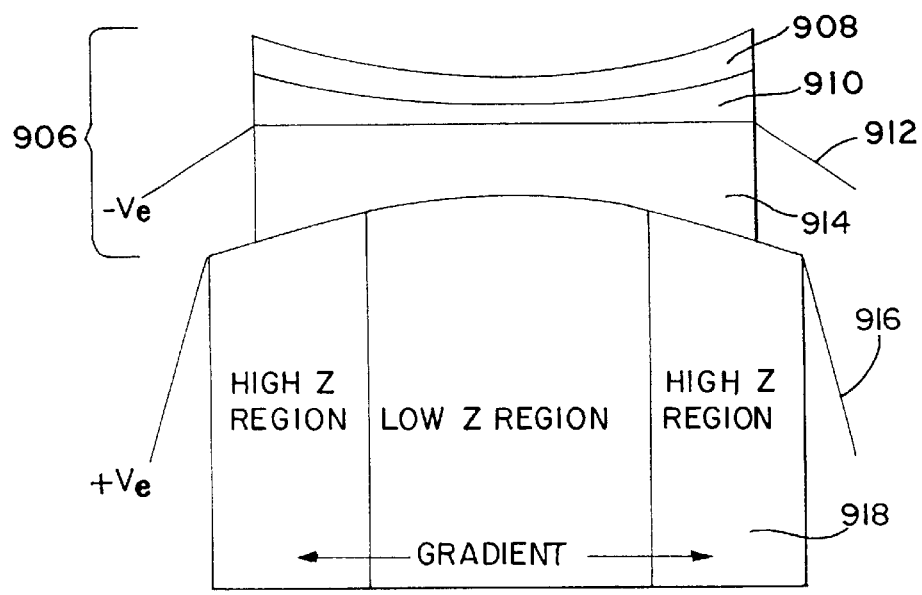
FIG. 9(b) shows a cross-section along the elevation direction of the corresponding backing block and plano-concave transducer array for the solid curve shown in FIG. 9(a).

FIG. 9(*a*) shows by a dotted line 902 the magnitude of the exiting radiation pressure in dB versus the elevation aperture from 0 to 14 mm, produced by a plano-concave transducer array having a bottom face that is curved in the elevation direction, stacked with a conventional backing block. A solid line 904 on FIG. 9(*a*) represents the result from the same plano-concave transducer array stacked with a variable acoustic impedance backing block. The variable acoustic impedance backing block varies in acoustic impedance along the elevation direction and thereby further improves the elevation aperture apodization achieved by the curve of the plano-concave transducer array.

FIG. 9(*b*) shows a cross-section along the elevation direction of the corresponding backing block 918 and plano-concave transducer array 914 for the solid curve shown in FIG. 9(*a*). Plano-concave transducer assembly 906 comprises low acoustic impedance matching layer 908, high acoustic impedance matching layer 910, ground return 912, transducer array (i.e., piezo-electric crystal) 914, and flexible circuit 916, and is stacked with variable acoustic impedance backing block 918. Plano-concave transducer array 914 is also called a "backward plano-concave" transducer array. The variable acoustic impedance backing block 918 has an acoustic impedance at the lateral azimuthal faces of the block that is relatively higher than the low acoustic impedance in the center.

The most preferred embodiments of the invention involve varying the acoustic impedance of a backing block in the elevation direction of an ultrasound transducer. However, alternative embodiments of the invention could involve varying the acoustic impedance of a backing block in the azimuthal direction to reduce or eliminate the need for electronic apodization in the azimuthal direction of an ultrasound transducer, and thereby reduce the cost of the apodization electronics in an ultrasound system.

The preferred embodiments herein have been described in connection with a traditional phased array with subdivided transducer elements. Other embodiments have been described in connection with plano-concave piezoelectric transducers. Backing blocks of the invention can also be used with linear, curved linear, sector, Vector® wide view, radial, and annular transducers. Moreover, backing blocks of the invention can be used with transducers that are not phased array transducers.

While PZT is preferred for fabricating the active transducer elements, other materials, such as composite PZT and polyvinyldiene fluoride (PVDF) can be used. Single crystal grown transducers and capacitor micro-machined ultrasound transducers (cMUTs) can also be used as the active transducer elements.

The exemplary embodiments described herein are for purposes of illustration and are not intended to be limiting. Examples of variations within the scope of this invention include, but are not limited to, the following:

A variable acoustic impedance backing block that achieves other apodization functions besides Hamming, Hanning, or raised cosine functions. Examples of other apodization functions include triangle, half circle, and parabolic functions.

A variable acoustic impedance backing block having an acoustic impedance gradient could be incorporated in a 1.5-D or 2-D phased array transducer probe.

Several alternative continuous and discontinuous gradients of variable acoustic impedance could be implemented to substantially achieve the intended benefits of the invention.

Therefore, those skilled in the art will recognize that other embodiments could be practiced without departing from the scope and spirit of the claims set forth below.

What is claimed is:

1. In a medical ultrasound probe subassembly, the improvement comprising: a backing block having a gradient in acoustic impedance that changes as a function of elevation or azimuth, the gradient adapted to provide apodization.

2. The improvement of claim 1, wherein of the backing block comprises metal particles or metal compound particles suspended in a matrix, and the particle concentration varies in a linear function from the center to a lateral face of the backing block.

3. In a medical ultrasound probe subasssembly, the improvement comprising a backing block having a gradient in acoustic impedance that changes as a function of elevation or azimuth, the backing block reducing elevation side lobe image artifacts displayed on a display device.

4. The improvement of claim 3, wherein the backing block includes at least one segment having tungsten particles in a vinyl matrix.

5. The improvement of claim 4, wherein the ultrasound probe subassembly includes a transducer array that has diced piezoelectric elements of uniform thickness.

6. The improvement of claim 4, wherein the ultrasound probe subassembly includes a transducer array that has diced piezoelectric elements with a variable thickness.

7. The improvement of claim 4, wherein the tungsten concentration in vinyl increases in elevation, from the center of the backing block outwards.

8. The improvement of claim 7, wherein the acoustic impedance of the backing block varies from substantially 3 MRayls to at least 11 MRayls.

9. The improvement of claim 7, wherein the acoustic impedance of the backing block varies from substantially 3 MRayls to at least 20 MRayls.

10. The improvement of claim 7, wherein the acoustic impedance of the backing block varies from substantially 3 MRayls to substantially 30 MRayls.

11. The improvement of claim 7, wherein the acoustic impedance of the backing block varies from substantially 0 MRayls to at least 11 MRayls.

12. The improvement of claim 7, wherein the acoustic impedance of the backing block varies from substantially 0 MRayls to at least 20 MRayls.

13. The improvement of claim 7, wherein the acoustic impedance of the backing block varies from substantially 0 MRayls to substantially 30 MRayls.

14. The improvement of claim 3, wherein the acoustic impedance of the backing block varies along the elevation direction of the ultrasound transducer array.

15. The improvement of claim 14, wherein the backing block comprises at least two substantially similar segments of backing block bonded together.

16. The improvement of claim 15, wherein for each segment of backing block, the acoustic impedance is lowest at a central interface where the segments are bonded in the center of the backing block, and the acoustic impedance is highest at the opposed lateral azimuthal faces of the backing block segment, parallel to the central interface.

17. In a medical ultrasound probe subassembly, the improvement comprising a backing block having a gradient in acoustic impedance that changes as a function of elevation or azimuth, the backing block comprising at least three segments, each segment having a substantially uniform acoustic impedance throughout the segment, but at least two of the segments having a different acoustic impedance from each other.

18. In a medical ultrasound probe subassembly, the improvement comprising a backing block having a gradient in acoustic impedance that changes as a function of elevation or azimuth, the backing block comprising at least two segments, each segment having a variable acoustic impedance substantially throughout the segment.

19. In a medical ultrasound probe subassembly, the improvement comprising a backing block having a gradient in acoustic impedance that changes as a function of elevation or azimuth, the backing block comprising metal particles or metal compound particles suspended in a matrix, and the acoustic impedance of the backing block varies according to the metal particle or metal compound particle concentration in the backing block.

20. The improvement of claim 19, wherein the acoustic impedance of the backing block varies from the center to a lateral face of the backing block as a linear, parabolic, exponential, Gaussian, or cosine function.

21. The improvement of claim 20, wherein the acoustic impedance of the backing block varies in the elevation direction.

22. The improvement of claim 21, wherein the backing block metal particle or metal compound particle concentration varies from a substantially zero particle concentration to at least 30 percent particle concentration by weight or volume.

23. The improvement of claim 21, wherein the backing block metal particle or metal compound particle concentration varies from a substantially zero particle concentration to at least 70 percent particle concentration by weight or volume.

24. The improvement of claim 21, wherein the backing block metal particle or metal compound particle concentration varies from a substantially zero particle concentration to at least 90 percent particle concentration by weight or volume.

25. The improvement of claim 20, wherein the acoustic impedance of the backing block varies in the azimuthal direction.

26. A diagnostic medical ultrasound transducer backing block with a variable acoustic impedance along at least one dimension of the backing block, having a gradient change in acoustic impedance from a minimum value of acoustic impedance substantially in the center of the backing block, increasing to a maximum value of acoustic impedance substantially at two or more planar lateral faces of the backing block.

27. The backing block of claim 26, wherein the backing block reduces the elevation side lobe sensitivity of the ultrasound transducer.

28. The backing block of claim 26, wherein the backing block offsets the negative apodization of an elevation geometric lens and reduces the transmission of lower side lobes during the transmission of ultrasound signals from the ultrasound transducer.

29. The backing block of claim 26, wherein the backing block reduces the azimuthal side lobe sensitivity of the ultrasound transducer.

30. The backing block of claim 26, wherein the acoustic impedance of the backing block varies along the elevation direction of an ultrasound transducer, and comprises a plurality of discrete segments of backing block.

31. The backing block of claim 26, wherein the acoustic impedance of the backing block varies along the elevation direction of an ultrasound transducer, the backing block comprises a plurality of segments, and at least two segments have or form gradients of acoustic impedance along the elevation direction of the ultrasound transducer.

32. The backing block of claim 26, comprising two substantially similar segments bonded at the center of the backing block, each having a gradient in acoustic impedance that increases with distance in the elevation direction.

33. A diagnostic medical ultrasound system, comprising an ultrasound probe subassembly that receives electrical signals from a transmit beamformer, said probe subassembly including an ultrasound transducer array and a backing block, wherein the backing block has a controlled gradient in acoustic impedance as a function of elevation and/or azimuth.

34. The system of claim 33, wherein the backing block varies in acoustic impedance in the elevation direction of the ultrasound transducer array.

35. The system of claim 34, wherein the backing block comprises a plurality of discrete segments of a matrix material.

36. The system of claim 35, wherein the matrix material is tungsten in vinyl.

37. The system of claim 33, wherein the ultrasound transducer array comprises a diced uniform thickness PZT layer.

38. A diagnostic medical ultrasound system, comprising an ultrasound probe subassembly that receives electrical signals from a transmit beamformer, said probe subassembly including an ultrasound transducer array and a backing block, wherein the backing block has a gradient in aacoustic impedance as a function of elevation and/or azimuth, wherein the backing block is stacked with the ultrasound transducer array to offset the negative apodization of an elevation geometric lens in a stacked relationship with the ultrasound transducer array.

39. An ultrasound transducer probe assembly, comprising:
   a geometric lens;
   a PZT layer cut to provide a plurality of ultrasound transducer elements;
   a matching layer to match acoustic impedance between the geometric lens and the PZT layer;
   a flexible circuit for controlling the PZT layer; and
   a backing block having a gradient change in acoustic impedance from a minimum value of acoustic impedance substantially in the center of the backing block, increasing to a maximum value of acoustic impedance substantially at two or more planar lateral faces of the backing block.

40. The ultrasound transducer probe assembly of claim 39, wherein the backing block varies in acoustic impedance along the elevation direction of the ultrasound transducer elements.

41. The ultrasound transducer probe assembly of claim 39, wherein the backing block varies in acoustic impedance along the azimuthal direction of the ultrasound transducer elements.

42. The ultrasound transducer probe assembly of claim 39, wherein the backing block comprises tungsten particles in a vinyl matrix.

43. The ultrasound transducer probe assembly of claim 39, wherein the acoustic impedance of the backing block varies along the elevation direction of the ultrasound transducer elements and comprises a plurality of segments of backing block.

44. The ultrasound transducer probe assembly of claim 39, wherein the acoustic impedance of the backing block varies along the elevation direction of the ultrasound transducer elements and the backing block comprises a plurality of segments, and at least two segments have or form gradients of acoustic impedance along the elevation direction of the ultrasound transducer elements.

45. A backing block with a variable acoustic impedance segmented along the elevation direction of an ultrasound transducer array, having a gradient in acoustic impedance increasing from a minimum value of acoustic impedance substantially in the center of the backing block to a maximum value of acoustic impedance substantially at two or more planar lateral faces of the backing block.

46. The backing block of claim 45, wherein the backing block reduces elevation side lobe image artifacts displayed on a display device.

47. The backing block of claim 45, wherein the backing block offsets the negative apodization of an elevation geometric lens stacked with an ultrasound transducer array, both of which are stacked above the backing block.

48. The backing block of claim 45, wherein the backing block has a variable acoustic impedance in the azimuthal direction.

49. An ultrasound transducer probe, comprising:
a backing block having a gradient change in acoustic impedance from a minimum value of acoustic impedance substantially in the center of the backing block, increasing to a maximum value of acoustic impedance substantially at two lateral azimuthal faces and/or two lateral elevation faces of the backing block; and
a non-uniform thickness ultrasound transducer array having two lateral azimuthal faces and two lateral elevation faces substantially parallel to corresponding lateral faces of the backing block, and two horizontal faces, one horizontal face proximal to the backing block, wherein the backing block is stacked with the ultrasound transducer array.

50. The ultrasound transducer probe of claim 49, wherein the acoustic impedance of the backing block varies in the elevation direction of the ultrasound transducer array.

51. The ultrasound transducer probe of claim 49, wherein the acoustic impedance of the backing block varies in the azimuthal direction of the ultrasound transducer array.

52. The ultrasound transducer probe of claim 49, wherein the non-uniform thickness ultrasound transducer array is substantially curved on the horizontal face opposite to the horizontal face proximal to the backing block, with a maximum thickness substantially at the lateral azimuthal faces of the ultrasound transducer array and a minimum thickness substantially at the center of the ultrasound transducer array in the elevation direction.

53. The ultrasound transducer probe of claim 49, wherein the non-uniform thickness ultrasound transducer array is substantially curved on the face proximal to the backing block, with a maximum thickness substantially at the lateral azimuthal faces of the ultrasound transducer array and a minimum thickness substantially at the center of the ultrasound transducer array in the elevation direction.

54. The ultrasound transducer probe of claim 49, wherein the non-uniform thickness ultrasound transducer array has a maximum thickness substantially at the lateral azimuthal faces of the ultrasound transducer array and a minimum thickness substantially at the center of the ultrasound transducer array in the elevation direction.

55. The ultrasound transducer probe of claim 49, wherein the non-uniform thickness ultrasound transducer array is substantially continuously curved and has a maximum thickness substantially at the lateral azimuthal faces of the ultrasound transducer array and a minimum thickness substantially at the center of the ultrasound transducer array in the elevation direction.

56. The ultrasound transducer probe of claim 49, wherein the non-uniform thickness ultrasound transducer array is substantially curved with discrete steps, with a maximum thickness substantially at the lateral azimuthal faces of the ultrasound transducer array and a minimum thickness substantially at the center of the ultrasound transducer array in the elevation direction.

* * * * *